Dec. 2, 1952   H. H. SCHOTT   2,619,895
COFFEE MAKER
Filed June 11, 1946   2 SHEETS—SHEET 1
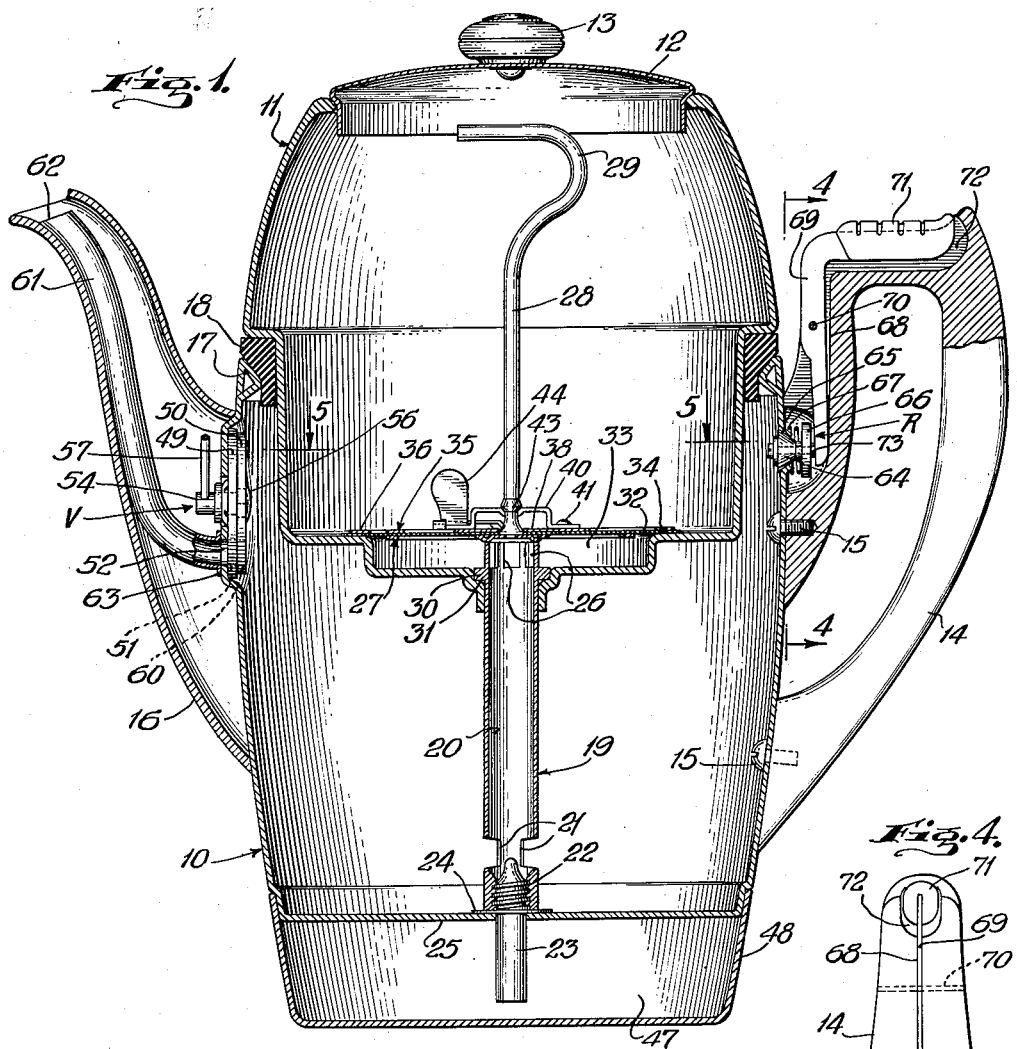
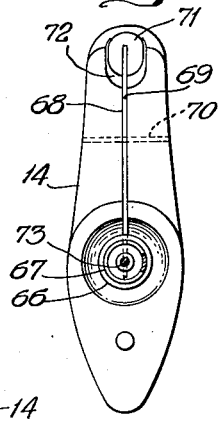
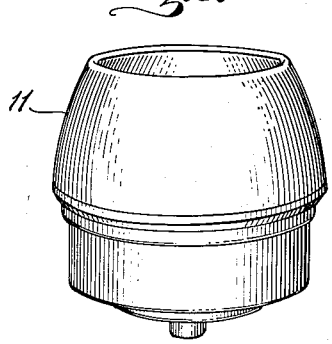
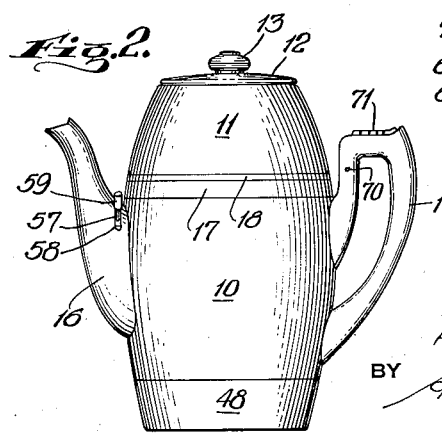
INVENTOR
H. H. Schott
BY
H. H. Golden
ATTORNEY Dec. 2, 1952 H. H. SCHOTT 2,619,895
COFFEE MAKER
Filed June 11, 1946 2 SHEETS—SHEET 2
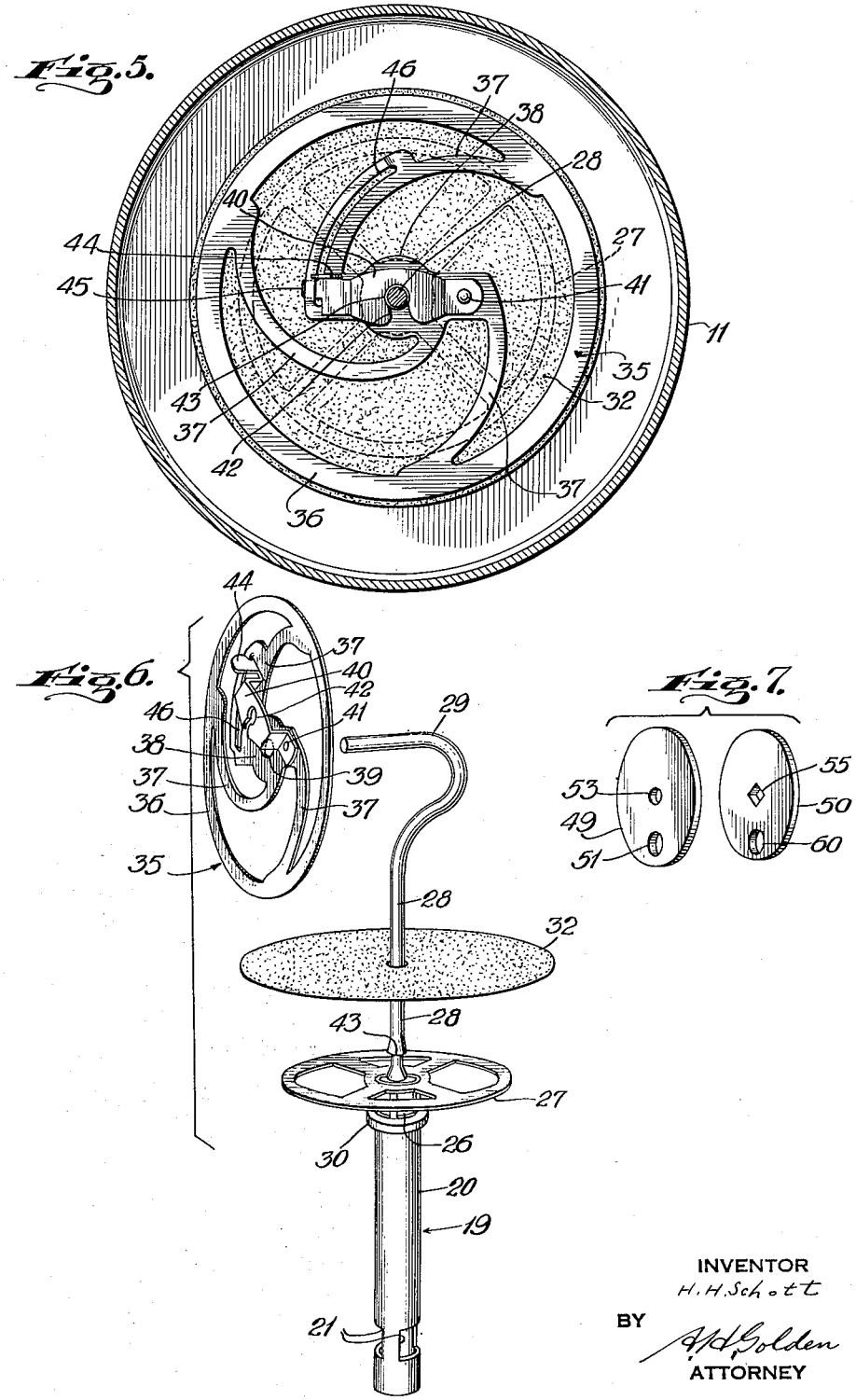
INVENTOR
H. H. Schott
BY
A. H. Golden
ATTORNEY Patented Dec. 2, 1952

2,619,895

UNITED STATES PATENT OFFICE 2,619,895

COFFEE MAKER

Howard H. Schott, Greenwich, Conn., assignor to The Yale & Towne Manufacturing Company, Stamford, Conn., a corporation of Connecticut Application June 11, 1946, Serial No. 675,988

18 Claims. (Cl. 99—292)

This invention relates to a coffee maker, and more particularly to a coffee maker of the vacuum type.

In coffee makers of the particular class it is customary to have a lower coffee pot and an upper coffee container adapted to be held in sealed relation to one another with coffee in the container and water in the pot, and with a filter between the container and the pot. The heating of the water causes it to flow through a tube from the pot into the container where it mingles with the coffee. Thereafter, upon discontinuance of the heat, the fluid which is now brewed coffee, moves downwardly through the filter and into the pot, leaving behind the coffee grounds.

Coffee makers of the particular class described are divided into two types. One type requires that the container be separated from the pot prior to the serving of the coffee. The second type does not require such separation of the container and pot so that the coffee may be made and served immediately without requiring a disassembly of the apparatus, thus contributing considerable convenience. My invention relates to a coffee maker of the second type.

It is the broad object of my invention to contribute a coffee maker of the type described that will lend itself to convenient and easy operation, while making coffee of very high quality.

One feature of my invention resides in the utilization of a securing element for holding the coffee container and the pot in assembled relation, this securing element functioning further as the tube through which the water is carried from the pot into the container and then in the form of coffee from the container into the pot.

Still a further feature of the invention resides in the particular construction of the securing element whereby it carries thereon a filter limit plate and a filter reinforcing element, the filter reinforcing element being adapted to maintain the filter in operative position while allowing the filter to yield under particular conditions.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized by those skilled in the art as a basis for the designing of other structures for carrying out the several purposes of my invention. It is important, therefore, that the claims to be granted me shall be of sufficient breadth to prevent the appropriation of my invention by those skilled in the art.

Referring now to the drawings, Fig. 1 is a vertical section through the coffee maker of my invention, illustrating rather fully its entire construction. Fig. 2 is an elevation showing the general shape of the coffee maker and illustrating the valve operating devices as they appear to the observer. Fig. 3 is a perspective view of the coffee container of my coffee maker. Fig. 4 is a section taken along lines 4—4 of Fig. 1. Fig. 5 is a section taken along lines 5—5 of Fig. 1. Fig. 6 is a perspective exploded view of the securing element, the filter limit plate carried thereby, the filter, and the filter reinforcing element. Fig. 7 is a perspective view of the two discs of my valve.

Referring now more particularly to the drawings, the coffee pot of my invention is designated by reference numeral 10, while the coffee container is designated by reference numeral 11, the top for the coffee container being designated by reference numeral 12 and shown equipped with a knob 13. A suitable handle 14 is secured to one side of the coffee maker by screws 15 extending from the inside of the pot into threaded bores of the handle 14. A spout 16 is suitably secured as by soldering to the coffee pot 10.

At this point it will be well to indicate that the particular mode of fabrication of my coffee maker is not in essence the invention herein to be covered, it being obvious that my coffee maker may be fabricated in many ways depending upon what may be considered preferable in various factories. It may be well to add, however, that I intend to form my spout 16 by the slush casting thereof, while the pot 10 and the container 11 may best be formed by spinning or drawing.

The rim 17 of the pot 10 supports thereon a rubber gasket 18, and seated on this gasket is the coffee container 11. For holding the container 11 firmly against the gasket 18 I utilize a securing element designated generally by reference numeral 19. Securing element 19 is formed with a tubular portion 20 having openings 21 at the lower end thereof, and threaded at 22 for co-action with a threaded stud 23 that is brazed or otherwise secured through a washer 24 to the bottom 25 of the pot 10. The upper portion of the tube 20 of the securing element 19 is formed with a series of openings 26 as best illustrated in Fig. 6 and has secured thereto a disc 27 that I term a filter limit plate. Fixed to the filter limit plate 27, and therefore to the tube 20, is a turn rod 28 bent at 29 to form a thumb piece whereby it may be rotated. Below the openings 26 there is formed on the tube 20 a circular flange 30 that is adapted to seat against a circular shoulder 31 formed on the coffee container 11.

It will be obvious to those skilled in the art that rotation of the turn rod 28 by its thumb piece 29 will cause the securing element 19 to rotate into the engaged relation with stud 23 that is illustrated in Fig. 1. This will act to bring the flange 30 of the tube 20 against the shoulder 31, the resulting pressure forcing the coffee container against the gasket 18 as is also illustrated in Fig. 1. It is obvious that with the parts in this particular position the interior of the coffee pot 10 will be sealed from the atmosphere except through the tube 20 and the coffee container 11.

Referring now more particularly to Fig. 6, it will be noted that the filter limit plate 27 is formed so that a filter 32 may be deposited thereon. The filter limit plate 27, as shown in Fig. 1, will lie at the upper part of a depressed portion 33 of the bottom of the coffee container 11 so that the filter 32 will extend into position to overlie the surface 34 of the coffee container immediately outlining the depression 33.

The filter 32 is held in the position of Fig. 1 against the surface 34 by what I term a filter reinforcing element 35 having a rim 36 and a series of curved ribs 37 extending from a center 38 that is formed with a bore 39. It is readily seen that through means of the bore 39 the filter reinforcing element 35 may be threaded onto the thumb piece 29 of the turn rod 28 and then down into the position of Figs. 1 and 5. For holding the filter reinforcing element firmly in the position of Figs. 1 and 5 so that it may bring pressure against the filter 32, I utilize a catch 40. This catch 40 is pivoted at 41 to the filter reinforcing element 35 and is notched at 42 so as to snap under a shoulder 43 of the turn rod 28 when moved into the position of Figs. 1 and 5. The catch is manipulated by a thumb piece 44 and is guided and reinforced by a tongue 45 thereof riding in a slot 46 of one of the curved ribs 37.

For heating the water within the pot 10 I utilize a heating element that is not shown, but is adapted for housing within the chamber 47 of a cup-like member 48 secured to the underside of the pot 10. As the heating element may be conventional and is not part of the invention herein to be described, it is not shown, but its action will be understood by those skilled in the art.

During the coffee making operation, the pot 10 must be maintained sealed from the atmosphere in order to effect operation of the coffee maker and to prevent the escape of the coffee aroma. For the particular purpose, I employ a valve mechanism designated by the letter V, and embodying a pair of discs 49 and 50 best shown in Fig. 7. The disc 49 is maintained fixed to the metal of the coffee pot 10 as by brazing or soldering and has a hole 51 adapted for alignment with an opening 52 in the surface of the pot 10. The disc 49 has a further opening 53 through which extends a shaft 54 having a square end passing through a square bore 55 in the disc 50 and then riveted to the disc 50 at 56 so as to hold that disc closely against the disc 49. Secured to the shaft 54 is a pin 57 that extends through a slot 58 of the spout 16 as best illustrated in Fig. 2. A finger piece 59 is secured to the pin 57 and is adapted to rotate that pin so as to rotate with it the shaft 54 and the disc 50. A hole 60 is formed in the disc 50 and it is the purpose of the finger piece 59 to rotate the disc 50 so as to bring its hole 60 into and out of alignment with the hole 51 of the disc 49.

Secured within the spout 16 in any suitable way is a tube 61 with one end thereof terminating at 62 just below the lip of the spout 16. The other end of the tube is secured at 63 to the shell of the coffee pot 10 in alignment with its hole 52 and therefore in alignment with the hole 51 of the disc 49. It is now obvious when the holes 51 and 60 of the valve discs 49 and 50 are in alignment, fluid will flow from the pot 10 through the tube 61 into any container. It is also obvious that by mere manipulation of finger piece 59, the discs 50 and 49 may be rotated relatively to one another to prevent any flow of fluid from the coffee pot and to seal effectively the pot from the atmosphere.

In order to relieve the vacuum within the coffee pot 10 when it is desired to pour the coffee therefrom, I provide a relief valve designated generally by the reference letter R. This relief valve utilizes a cone-shaped plug 64 adapted to be seated against a cone-shaped opening 65 formed in the outer surface of the coffee pot 10. A disc 66 is suitably secured to the plug 64 and a spring 67 presses at one end against the disc and at the other end against the surface of the pot 10. It is obvious that the spring will maintain the cone-shaped plug 64 seated against the surface of the opening 65 whereby to effectively seal the interior of the pot from the atmosphere.

The handle 14 is slotted as at 68, and fitted into the slot 68 is a lever 69 pivoted relatively to the handle by a pin 70. At the upper end of the lever 69 there is secured a decorative finger piece 71 lying in a depression 72 formed in the upper part of the handle 14. The lower end of the lever 69 presses against the end of a screw 73 that is utilized to hold in assembled relation the disc 66 and the cone-shaped plug 64. It is now obvious that when the coffee pot is held by the hand the thumb will readily depress the thumb piece 71 so as to rotate the lever 69 clockwise about the pin 70 in Fig. 1. This will act to move the screw 73 and the cone 64 against the force of spring 67 so as to break the seal normally established by the cone-shaped plug 64.

While I believe the construction and operation of my coffee maker will now be quite apparent to those skilled in the art, it may be well to outline the manner in which the coffee maker is utilized.

When it is desired to make coffee, the valve mechanism V is first closed by proper operation of the finger piece 59. Water is then put into the pot 10 and the container 11 placed against gasket 18. A new filter 32 is then placed against the filter limit plate 27 and superimposed thereagainst is the filter reinforcing element 35, threaded into position and then held by the catch 40. The turn rod 28 is then rotated so that the securing element 19 is brought into the secured position relatively to the stud 23 illustrated in Fig. 1. During this operation the circular flange 30 is pressed against the circular shoulder 31 of the container 11 to bring the container firmly down against the gasket 18. The filter 32 is, of course, now firmly seated against the surface 34 of the coffee container 11 and is reinforced by the filter securing element 35. A suitable amount of coffee is placed into the container 11 and heat is applied. Upon application of heat, coffee will be made in the usual manner of coffee makers of the particular class. However, it will now not be necessary to disassemble the container 11 from the coffee pot 10, as it is possible to serve the coffee directly from the pot 10. In order to serve the coffee, the finger piece 59 is now moved to establish communication through bores 51 and 60 of the valve discs 49 and 50 so that coffee will flow from the pot through the tube 61 and outwardly from the spout 16. In order to effect a smooth flow of the coffee, the hand of the person pouring the coffee will be so arranged that his thumb will depress the thumb piece 71, breaking the seal normally effected by the cone-shaped plug 64. Of course, once all the coffee is poured, it will be a very simple task to disassemble the coffee maker and to clean it for future use.

I now claim:

1. In a coffee maker of the class described, a coffee pot, a coffee container adapted to be seated against a sealing surface of said coffee pot, said coffee container having an opening therein communicating the interior of the coffee container with the interior of the coffee pot, a securing member in the said coffee pot, a tubular securing element adapted to be inserted through the interior of said coffee container whereby to traverse the opening of said coffee container, means on said tubular securing element for entering into securing engagement with said securing member when said tubular securing element is inserted through the interior of said coffee container and through said opening, means on said tubular securing element adapted to press and maintain said coffee container against said sealing surface, and said tubular securing element having openings therein for the flow of fluid between said container and pot while said tubular securing element holds said coffee container and coffee pot assembled.

2. In a coffee maker of the class described, a coffee pot, a coffee container adapted to be seated against a sealing surface of said coffee pot, said coffee container having an opening therein communicating the interior of the coffee container with the interior of the coffee pot, a securing member in the said coffee pot, a tubular securing element adapted to be inserted through the interior of said coffee container whereby to traverse the opening of said coffee container, means on said tubular securing element for entering into securing engagement with said securing member when said tubular securing element is inserted through the interior of said coffee container and through said opening, means on said tubular securing element adapted to press and maintain said coffee container against said sealing surface, and said tubular securing element having an opening therein positioned at the lower portion of said coffee pot and a further opening at the lower end of said coffee container for the flow of fluid between said container and pot while said tubular securing element holds said coffee container and coffee pot assembled.

3. In a coffee maker of the class described, a coffee pot, a coffee container adapted to be seated against a sealing surface of said coffee pot, said coffee container having an opening therein communicating the interior of the coffee container with the interior of the coffee pot, a securing member in the said coffee pot, a tubular securing element adapted to traverse the opening of said coffee container and to enter into securing engagement with said securing member, a flange on said tubular securing element adapted to lie against a shoulder of said coffee container whereby to press and maintain said coffee container against said sealing surface, and said tubular securing element having an opening therein positioned at the lower portion of said coffee pot and a further opening at the lower end of said coffee container above said flange for the flow of fluid between said container and pot while said tubular securing element holds said coffee container and coffee pot assembled.

4. In a coffee maker of the class described, a coffee pot, a coffee container adapted to be seated against a sealing surface of said coffee pot, said coffee container having an opening therein communicating the interior of the coffee container with the interior of the coffee pot, a threaded securing member fixed to the said coffee pot, a tubular securing element adapted to be inserted through the interior of said coffee container whereby to traverse the opening of said coffee container; threaded means on said tubular securing element for securing engagement with said securing member when said tubular securing element is inserted through the interior of said coffee container and through said opening, means on said tubular securing element adapted to press and maintain said coffee container against said sealing surface, and said tubular securing element having openings therein positioned for the flow of fluid between said container and pot while said tubular securing element holds said coffee container and coffee pot assembled.

5. In a coffee maker of the class described, a coffee pot, a coffee container adapted to be seated against a sealing surface of said coffee pot, said coffee container having an opening therein communicating the interior of the coffee container with the interior of the coffee pot, a threaded securing member fixed to the bottom of said coffee pot, a tubular securing element adapted to traverse the opening of said coffee container and threaded for securing engagement with said securing member, a flange on said tubular securing element adapted to lie against a shoulder of said coffee container whereby to press and maintain said coffee container against said sealing surface, and said tubular securing element having an opening therein positioned at the lower portion of said coffee pot and a further opening at the lower end of said coffee container above said flange for the flow of fluid between said container and pot while said tubular securing element holds said coffee container and coffee pot assembled.

6. In a coffee maker of the class described, a coffee pot, a coffee container adapted to be seated against a sealing surface of said coffee pot, said coffee container having an opening therein communicating the interior of the coffee container with the interior of the coffee pot, a securing member in the said coffee pot, a tubular securing element adapted to be inserted through the interior of said coffee container whereby to traverse the opening of said coffee container and to enter into securing engagement with said securing member, means on said tubular securing element adapted to press and maintain said coffee container against said sealing surface, said tubular securing element having openings therein positioned for the flow of fluid between said container and pot while said tubular securing element holds said coffee container and coffee pot assembled, filter holding means carried on said tubular securing element, and a surface on said coffee container against which a filter is held by said filter holding means when said tubular securing element maintains said coffee container and coffee pot in assembled relation.

7. In a coffee maker of the class described, a coffee pot, a coffee container adapted to be seated against a sealing surface of said coffee pot, said coffee container having an opening therein communicating the interior of the coffee container with the interior of the coffee pot, a securing member in the said coffee pot, a tubular securing element adapted to traverse the opening of said coffee container and to enter into securing engagement with said securing member, means on said tubular securing element adapted to press and maintain said coffee container against said sealing surface, said tubular securing element having openings therein positioned for the flow of fluid between said container and pot while said tubular securing element holds said coffee container and coffee pot assembled, a filter limit plate on said tubular securing element adapted for the deposit of a filter thereon, a filter reinforcing element adapted to press said filter toward a surface of said coffee container when said tubular securing element holds said coffee container and coffee pot in assembled relation, and means releasably securing said reinforcing element on said tubular securing element.

8. In a coffee maker of the class described, a coffee pot, a coffee container adapted to be seated against a sealing surface of said coffee pot, said coffee container having an opening therein communicating the interior of the coffee container with the interior of the coffee pot, a securing member in the said coffee pot, a tubular securing element adapted to traverse the opening of said coffee container and to enter into securing engagement with said securing member, means on said tubular securing element adapted to press and maintain said coffee container against said sealing surface, said tubular securing element having openings therein positioned for the flow of fluid between said container and pot while said tubular securing element holds said coffee container and coffee pot assembled, a filter limit plate on said tubular securing element adapted for the deposit of a filter thereon, and a filter reinforcing element mounted on said tubular securing element adapted to press said filter toward a surface of said coffee container when said tubular securing element holds said coffee container and coffee pot in assembled relation.

9. In a coffee maker of the class described, a coffee pot, a coffee container adapted to be seated against a sealing surface of said coffee pot, said coffee container having an opening therein communicating the interior of the coffee container with the interior of the coffee pot, a securing member in the said coffee pot, a tubular securing element adapted to traverse the opening of said coffee container and to enter into securing engagement with said securing member, means on said tubular securing element adapted to press and maintain said coffee container against said sealing surface, said tubular securing element having openings therein positioned for the flow of fluid between said container and pot while said tubular securing element holds said coffee container and coffee pot assembled, an upper extension for said tubular securing element formed to present a thumb piece whereby said tubular securing element may be manipulated, a filter limit plate mounted on said tubular securing element for the deposit of a filter thereon, a filter reinforcing element adapted to press said filter toward a surface of said coffee container when said tubular securing element holds said coffee container and coffee pot in assembled relation, said filter reinforcing element having a central opening whereby it may be threaded over said upper extension, and means releasably securing said reinforcing element on said tubular securing element in reinforcing relation to said filter.

10. In a coffee maker of the class described, a coffee pot, a coffee container adapted to be seated against a sealing surface of said coffee pot, said coffee container having an opening therein communicating the interior of the coffee container with the interior of the coffee pot, a securing member in the said coffee pot, a tubular securing element adapted to traverse the opening of said coffee container and to enter into securing engagement with said securing member, means on said tubular securing element adapted to press and maintain said coffee container against said sealing surface, said tubular securing element having openings therein positioned for the flow of fluid between said container and pot while said tubular securing element holds said coffee container and coffee pot assembled, a filter reinforcing element supported on said tubular securing element adapted to press a filter toward a surface of said coffee container when said tubular securing element holds said coffee container and coffee pot in assembled relation, and means releasably securing said filter reinforcing element in filter reinforcing position on said tubular securing element.

11. In a coffee maker of the class described, a coffee pot, a coffee container adapted to be seated against a sealing surface of said coffee pot, said coffee container having an opening therein communicating the interior of the coffee container with the interior of the coffee pot, a securing member in the said coffee pot, a tubular securing element adapted to traverse the opening of said coffee container and to enter into securing engagement with said securing member, means on said tubular securing element adapted to press and maintain said coffee container against said sealing surface, said tubular securing element having openings therein positioned for the flow of fluid between said container and pot while said tubular securing element holds said coffee container and coffee pot assembled, an upper extension for said tubular securing element formed to present a thumb piece whereby it may be manipulated, a filter reinforcing element adapted to press a filter toward a surface of said coffee container when said tubular securing element holds said coffee container and coffee pot in assembled relation, said filter reinforcing element having a central opening whereby it may be threaded over said upper extension, and means releasably securing said reinforcing element on said tubular securing element in reinforcing relation to said filter.

12. In coffee maker of the class described, a coffee pot, a coffee container adapted to be seated against a sealing surface of said coffee pot, said coffee container having an opening therein communicating the interior of the coffee container with the interior of the coffee pot, a securing member in the said coffee pot, a tubular securing element adapted to traverse the opening of said coffee container and to enter into securing engagement with said securing member, means on said tubular securing element adapted to press and maintain said coffee container against said sealing surface, said tubular securing element having openings therein positioned for the flow of fluid between said container and pot while said tubular securing element holds said coffee container and coffee pot assembled, a filter limit plate on said tubular securing element adapted for the deposit of a filter thereon and adapted to lie within the coffee container when said tubular securing element holds said coffee pot and coffee container assembled, said coffee container being formed of such shape relatively to said filter limit plate that said plate does not contact the surface of said coffee container, a filter reinforcing element mounted on said tubular securing element adapted to press said filter toward a surface of said coffee container when said tubular securing element holds said coffee container and coffee pot in assembled relation, and means releasably securing said reinforcing element on said tubular securing element.

13. In a coffee maker of the class described, a coffee pot, a coffee container adapted to be seated against a sealing surface of said coffee pot, said coffee container having an opening therein communicating the interior of the coffee container with the interior of the coffee pot, a securing member in the said coffee pot, a tubular securing element adapted to traverse the opening of said coffee container and to enter into securing engagement with said securing member, means on said tubular securing element adapted to press and maintain said coffee container against said sealing surface, said tubular securing element having openings therein positioned for the flow of fluid between said container and pot while said tubular securing element holds said coffee container and coffee pot assembled, an upper extension for said tubular securing element formed to present a thumb piece whereby it may be manipulated, a filter limit plate mounted on said tubular securing element for the deposit of a filter thereon and lying within said coffee container when said tubular securing element holds said coffee container and coffee pot assembled, said coffee container being formed of such shape relatively to said filter limit plate that said plate does not contact the surface of said coffee container, a filter reinforcing element adapted to press said filter toward a surface of said coffee container when said tubular securing element holds said coffee container and coffee pot in assembled relation, said filter reinforcing element having a central opening whereby it may be threaded over said upper extension toward said limit plate and filter, and means releasably securing said reinforcing element on said tubular securing element in reinforcing relation to said filter.

14. In a coffee maker of the class described, a coffee pot, a coffee container adapted to be seated against a sealing surface of said coffee pot, said coffee container having an opening therein communicating the interior of the coffee container with the interior of the coffee pot, a securing member in the said coffee pot, a tubular securing element adapted to traverse the opening of said coffee container and to enter into securing engagement with said securing member, a flange on said tubular securing element adapted to lie against a shoulder of said coffee container whereby to press and maintain said coffee container against said sealing surface, said tubular securing element having openings therein positioned for the flow of fluid between said container and pot while said tubular securing element holds said coffee container and coffee pot assembled, filter carrying means secured on said tubular securing element above said flange, and a surface on said coffee container against which a filter is held by said filter carrying means when said tubular securing element holds said coffee container and coffee pot in assembled relation.

15. In a coffee maker of the class described, a coffee pot, a coffee container adapted to be seated against a sealing surface of said coffee pot, said coffee container having an opening therein communicating the interior of the coffee container with the interior of the coffee pot, a securing member in the said coffee pot, a tubular securing element adapted to traverse the opening of said coffee container and to enter into securing engagement with said securing member, a flange on said tubular securing element adapted to lie against a shoulder of said coffee container whereby to press and maintain said coffee container against said sealing surface, said tubular securing element having openings therein positioned for the flow of fluid between said container and pot while said tubular securing element holds said coffee container and coffee pot assembled, a filter limit plate on said tubular securing element above said flange adapted for the deposit of a filter thereon, a filter reinforcing element adapted to press said filter toward a surface of said coffee container when said tubular securing element holds said coffee container and coffee pot in assembled relation, and means releasably securing said reinforcing element on said tubular securing element.

16. In a coffee maker of the class described, a coffee pot, a coffee container adapted to be seated against a sealing surface of said coffee pot, said coffee container having an opening therein communicating the interior of the coffee container with the interior of the coffee pot, a securing member in the said coffee pot, a tubular securing element adapted to traverse the opening of said coffee container and to enter into securing engagement with said securing member, means on said tubular securing element adapted to press and maintain said coffee container against said sealing surface, said tubular securing element having openings therein positioned for the flow of fluid between said container and pot while said tubular securing element holds said coffee container and coffee pot assembled, a filter limit plate on said tubular securing element adapted for the deposit of a filter thereon, a filter reinforcing element adapted to press said filter toward a surface of said coffee container when said tubular securing element holds said coffee container and coffee pot in assembled relation, and means releasably securing said reinforcing element on said tubular securing element, said reinforcing element being relatively weak so as to flex under the influence of strong pressures.

17. In a coffee maker of the class described, a coffee pot, a coffee container adapted to be seated against a sealing surface of said coffee pot, said coffee container having an opening therein communicating the interior of the coffee container with the interior of the coffee pot, a securing member in the said coffee pot, a tubular securing element adapted to traverse the opening of said coffee container and to enter into securing engagement with said securing member, means on said tubular securing element adapted to press and maintain said coffee container against said sealing surface, said tubular securing element having openings therein positioned for the flow of fluid between said container and pot while said tubular securing element holds said coffee container and coffee pot assembled, a filter reinforcing element adapted to press a filter toward a surface of said coffee container when said tubular securing element holds said coffee container and coffee pot in assembled relation, means releasably securing said reinforcing element on said tubular securing element in reinforcing relation to said filter, and said reinforcing element being relatively weak so as to flex under the influence of strong pressures.

18. In a coffee maker of the class described, a coffee pot having a sealing seat for a coffee container, a coffee container nested into said pot and having a surface seated against said sealing seat, a depression in the bottom of said coffee container having an opening therein, a threaded stud on the bottom of the coffee pot, a threaded tube inserted through said opening and threaded to engage said stud, a flange on said tube pressing against the metal outlining said opening whereby to maintain said coffee container seated on said sealing seat when said tube is threaded on to said stud, a filter limit plate on said tube above said flange and lying substantially in the depression of said coffee container, said tube having openings between said flange and filter limit plate and also at the lower end thereof, a filter reinforcing element adapted to press a filter toward the surface of said pot outlining said depression when said tubular securing element holds said coffee container and coffee pot in assembled relation, and means releasably securing said reinforcing element on said tubular securing element.

HOWARD H. SCHOTT.

REFERENCES CITED

The following references are of record in the file of this patent:

UNITED STATES PATENTS

| Number | Name | Date |
|---|---|---|
| 830,422 | Epperson | Sept. 4, 1906 |
| 871,491 | Dunlap | Nov. 19, 1907 |
| 871,492 | Dunlap | Nov. 19, 1907 |
| 983,130 | Flatau | Jan. 31, 1911 |
| 1,195,487 | Maignen | Aug. 22, 1916 |
| 1,380,302 | Moe | May 31, 1921 |
| 1,822,238 | Albanese | Sept. 8, 1931 |
| 2,057,616 | Keaton | Oct. 13, 1936 |
| 2,072,199 | DeAyala | Mar. 2, 1937 |
| 2,164,158 | Masin | June 27, 1939 |
| 2,232,614 | Kopf | Feb. 18, 1941 |
| 2,345,262 | Jepson et al. | Mar. 28, 1944 |
| 2,388,335 | McCullough | Nov. 6, 1945 |

FOREIGN PATENTS

| Number | Country | Date |
|---|---|---|
| 25,138 | Germany | Dec. 18, 1883 |